United States Patent [19]

Blair

[11] Patent Number: 5,432,798
[45] Date of Patent: Jul. 11, 1995

[54] DATA COMMUNICATION METHOD AND SYSTEM

[75] Inventor: Christopher D. Blair, Cambridge, England

[73] Assignee: British Telecommunications, plc, United Kingdom

[21] Appl. No.: 1,226

[22] Filed: Jan. 6, 1993

Related U.S. Application Data

[63] Continuation of Ser. No. 550,840, Jul. 11, 1990, abandoned.

[30] Foreign Application Priority Data

Jul. 19, 1989 [GB] United Kingdom ............. 8916489

[51] Int. Cl.6 ............................................. H04L 1/16
[52] U.S. Cl. ...................................................... 371/32
[58] Field of Search ............................. 371/32, 33, 35

[56] References Cited

U.S. PATENT DOCUMENTS

| | | | |
|---|---|---|---|
| 4,725,834 | 3/1988 | Chang et al. | 340/825.5 |
| 4,888,767 | 12/1989 | Furuya et al. | 370/95.2 |
| 4,914,654 | 4/1990 | Matsuda et al. | 370/94.1 |
| 4,951,281 | 8/1990 | Muto et al. | 370/85.8 |

FOREIGN PATENT DOCUMENTS 0263421 4/1988 European Pat. Off. .

OTHER PUBLICATIONS

Calo, S., et al, "A Broadcast Protocol for File Transfers to Multiple Sites", *IEEE Trans. on Communications*, vol. COM-29, No. 11, Nov. 1981, pp. 1701-1707.
Gopal, I., et al, "Point-to-Multipoint Communication Over Broadcast Links", *IEEE Trans. on Communications*, vol. COM-32, No. 9, Sep. 1984, pp. 1034-1044.
IEE Proceedings of the Institution of Electrical Engineers, vol. 133 No. 3, part F. Jun. 1986, pp. 271-276. G. Benelli: "Go-back-N ARQ scheme with buffer at the receiver". p. 271.
IBM Technical Disclosure Bulletin, vol. 26, No. 108, Mar. 1984, pp. 5447-5450, New York, US; I. S. Gopal et al: "Full-memory go-back-N protocol for point-to-multipoint communication".

*Primary Examiner*—Stephen M. Baker
*Attorney, Agent, or Firm*—Nixon & Vanderhye

[57] ABSTRACT

A method of multipoint communications utilizes a protocol in which data messages (10) sent by a primary source are multicast to a plurality of secondary receiving stations ($S_1 \ldots S_n$). Each message packet contains a control field comprising a station identifier code (14) and an instruction for the specified station to acknowledge a predetermined number of messages. Each successive message packet comprises a station identifier code which differs in an alterable set cyclical sequence. Thus, acknowledgements of correct receipt of data are taken in a cycle of length L such that in a space of L messages each receiver must acknowledge at least once. In this way the primary source need only keep the L latest messages because all the stations have acknowledged correct receipt of at least up to the current message minus L. The multipoint communications method uses a protocol which can be applied to existing communications networks.

32 Claims, 2 Drawing Sheets

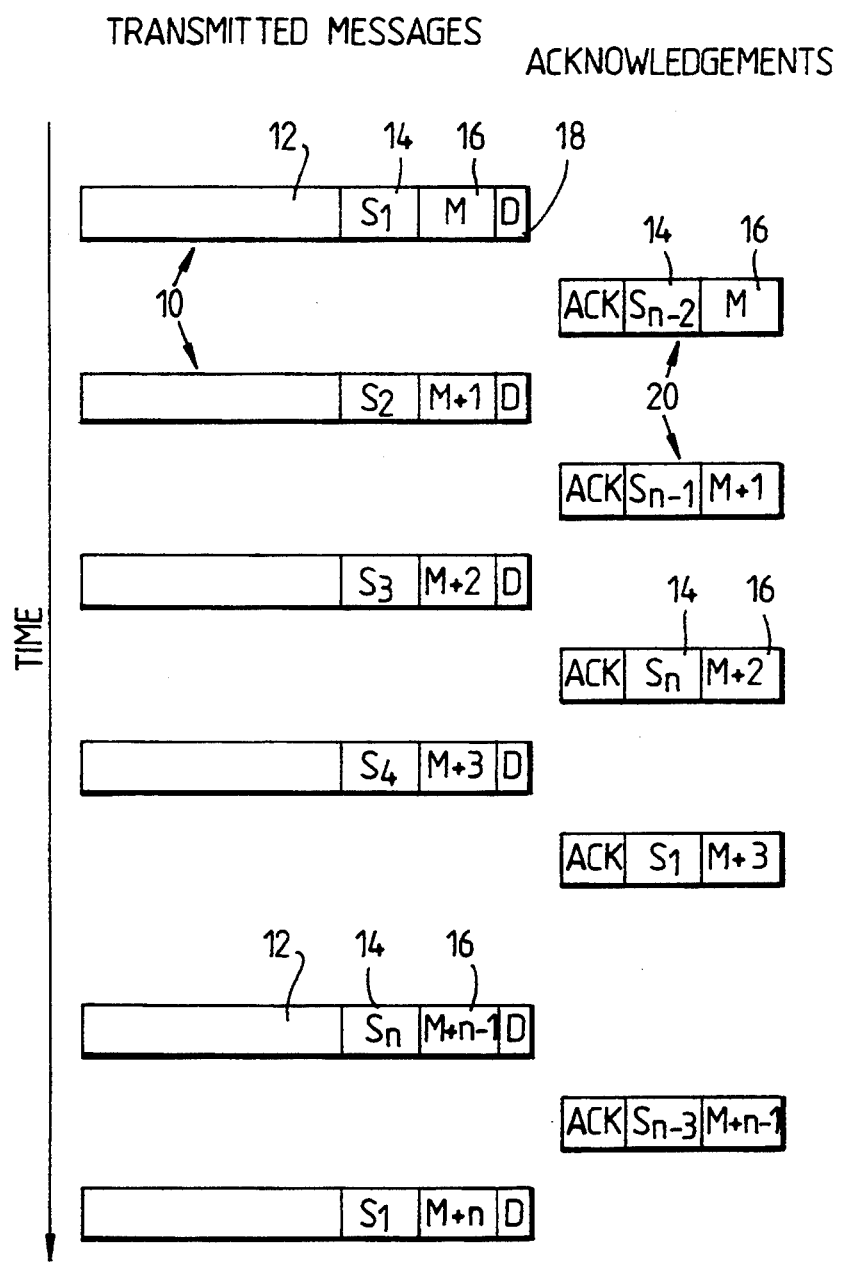

5,432,798

DATA COMMUNICATION METHOD AND SYSTEM

This is a continuation of application Ser. No. 07/550,840, filed Jul. 11, 1990, now abandoned.

BACKGROUND

1. Field of the Invention

This invention relates to data communications. The invention is particularly applicable to multipoint communication between computers over a communication network.

2. Prior Art and Other Considerations

The majority of computer communications currently take place as a controlled interaction between two computers. This is known as "point-to-point" interaction and is often achieved by means of a "virtual circuit" i.e. a logical connection between two computers established and controlled by the communication protocols used by them. Increasingly, it is necessary to establish "multipoint" communication protocols. This situation is analogous to that in other forms of multicast communications in which the transfer of information transmitted by a source is received by all receivers tuned to accept the information and which are switched on at the time of transmittal, for example a television transmission and reception system. Such a protocol should be both efficient and flexible and yet as simple a means of controlling communications between large groups of computers as possible.

A basic but relatively unreliable protocol is provided by, for example, the IEEE 802.2 Logical Link Control protocol which can be operated on local area networks (LANs). This and other protocols which operate on local and wide area networks provide multipoint datagram services, i.e. data is multicast to all receivers.

There are two basic techniques by which the correctness of the data received can be monitored by primary stations sending data to one or more secondaries. Both rely on the acknowledgement of a transmitted message by sending back to the originating primary an acknowledging message notifying the originator of the correct receipt of one or more previous messages.

Firstly, there is "positive acknowledgement", in which messages are acknowledged upon correct reception. If this acknowledgement is not detected by the sending primary station by a certain time, the message is retransmitted. This may be repeated up to a set number of attempts, after which the link will be declared failed. This is the standard method of error correction in a point-to-point link.

Secondly, there is "negative acknowledgement" in which a message is sent back by a secondary to the primary originator notifying the latter of a loss of one or more previous messages. Thus, each station need not acknowledge every message. However, there is a compromise with the need to keep a copy of any message not yet acknowledged, in case it has been lost. The less frequently each station acknowledges, the longer the uncertainty period and the more messages must be stored.

In "one-to-many", i.e. multipoint, communication it is impracticable to use positive acknowledgement as the number of returned acknowledgement messages could swamp the primary transmitting station and/or the network. Clearly, the problem becomes more acute with an increasingly large number of secondary stations. Thus, there is a need to limit the number of acknowledgements.

EP 263421 describes a "many-to-one" communications system which uses a basic form of restricted acknowledgement technique. In this case, the central station itself uses negative acknowledgement to respond to data messages from remote secondary stations, but employs a simple polling system to elicit acknowledgements from the secondaries as a means of checking that they are operational. The central station thus sends a polling request, which is independent of any data message, to each secondary in turn. The secondaries are then each required to respond to their respective polling request, with a response which merely acknowledges that the polling request has been received and that (by implication) the secondary concerned is operational. However, there is no special acknowledgement system with respect to other messages sent from the central station.

One method for doing this is to send "explicit" control information to the secondaries, either as part of a data packet or as separate messages, instructing them which messages to acknowledge. For example, one station ($S_1$) may be instructed to acknowledge data message number 1 and every fiftieth message thereafter. Likewise, another station ($S_2$) may be instructed to acknowledge message number 2 and every fiftieth message thereafter. This "priming" of secondary stations allows subsequent messages to be sent without such control information. As an alternative to this instruction of the secondary station acknowledgement, each data message itself can include a station "identifier" which requests the secondary to acknowledge either this or a particular subsequent message. This ongoing acknowledgement control is more suitable for dynamically changing groups where it is not practicable to predefine the entire sequence of responses as above. Since the instructions are relative to the current message, they are independent of any absolute sequence number that may be a part of the message.

U.S. Pat. No. 4,725,834 describes a scheme whereby a single recipient secondary in a multipoint communication system is designated as a "token site" and is responsible for acknowledging the received multicast message. All the other sites in a group "listen" to both the primary originator of the message and to the acknowledgements from the token sites. Should any of the secondaries detect a gap in the messages it receives, based on the monitoring of both the messages and the acknowledgements, it may request a retransmission from the token site. By rotating the token site amongst all recipients in a group, it is possible to ensure reliable reception of all messages at all sites with less acknowledgement than is required in a less sophisticated scheme.

Thus, there is a method of data communication between a primary source and a group of secondary receivers which comprises:

transmitting data messages from the source to the receivers;

transmitting an acknowledgement from a receiver, on correct receipt of a data message transmitted; and storing, in buffer storage means, a set of latest data messages, for retransmission of at least one of the said set in the event that no acknowledgement of at least that said one of the said set of data messages is received successfully by the source.

However, one problem to arise when such a scheme as this is implemented is that all members of a group must maintain an accurate list of the group membership. This requires a complex reformation protocol (as described in U.S. Pat. No. 4,725,834) in the event of even a single secondary station failure.

Another problem is that an increase in the group size requires a proportionate increase in the capacity of the buffer storage at each secondary. Either this, or the number of instruction messages used to rotate the designation of the token site must increase proportionately.

The scheme is also inefficient in that all acknowledgements must be processed by all group members. For some applications the strict ordering of messages from different sources required by this protocol is excessively elaborate. On the one hand, this works well for ensuring the consistency of a distributed database, such as the local area network (LAN) for which it was designed. On the other hand, this imposes an excessively long completion time on each transmission which would be unacceptable in certain other applications.

SUMMARY

It is an object of the present invention to provide a flexible, reliable and easy-to-use multipoint communications protocol that can be implemented using existing network standards.

The present invention is characterised in that each receiver transmits, in accordance with a cyclic sequence among at least some of the receivers, an acknowledgement indicative of correct receipt by that receiver of a set of latest data messages transmitted.

Conveniently, the source will solicit acknowledgements by "priming" the receivers with appropriate control information, so that each receiver in sequence acknowledges a different one of successive sets of data messages, the sets differing as to the latest data message transmitted by the source prior to the transmission of a corresponding solicited acknowledgement. The acknowledgement may be solicited from a particular receiver by including with the data message a request for that receiver from which acknowledgement is required to confirm that the messages to be acknowledged have been successfully received. This solicitation is made of the receivers in accordance with the cyclic sequence.

This "dynamic acknowledgement" allows the buffer to store only those messages not acknowledged by each receiver as part of a particular set in time. Each receiver will acknowledge a slightly different set as the set of data messages is amended with the transmission of a new one. When any one particular data message has been acknowledged as part of different sets acknowledged by each receiver it can be discarded.

A method employing such a protocol has the benefits that it provides high reliability, at least on a par with acknowledged point-to-point communications protocols, coupled with reduced bounded transmission time.

The present invention also extends to a data communication system comprising:

a primary source for transmitting data messages;

a plurality of receivers each including means for transmitting an acknowledgement on correct receipt of a data message; and buffer storage means for storing a set of latest data messages and including means for retransmitting at least one of the said set in the event that no acknowledgement of at least that said one of the said set of data messages is received successfully by the source; characterised in that:

each receiver is arranged to transmit, in accordance with a cyclic sequence among at least some of the receivers, an acknowledgement indicative of correct receipt by that receiver of a set of latest data messages transmitted.

Preferably, each data message comprises a receiver identifier code and this is used to solicit an acknowledgement from a receiver in accordance with instructions in the code. The data messages have receiver identifier codes in accordance with the cyclic sequence. Thus, a dynamic acknowledgement solicitation is sent along with the data message, ensuring that the correlation between the data message and the correct solicitation in the sequence is maintained. In one form the solicited acknowledgement is delayed for a number of data messages in accordance with further instructions contained in each data message.

Normally, the number of data messages for which the acknowledgement is delayed would be established during the initial connection establishment phase rather than be transmitted in every data message. This delay is usually equal to the number of data messages stored in the buffer at the secondary. Since this number rarely changes, it is not worth the extra overhead of repeating it each time.

In practice, this may be achieved by using a combination of "explicit control" and dynamic control. A special control message ("Connect Request") is transmitted before transmission of data begins to one or more secondaries. Part of this message may identify a number of secondaries which are thus "pre-designated" to respond to the first few data messages. The number of secondaries designated can be related directly to the resilience level (i.e. the number of receiving stations that can fail before any of the messages are lost) and hence the number of messages stored at each secondary. Thus all secondaries note this number before data transmission begins.

There may be a need to adjust this "resilience level" during the connection but this will only be by a small amount at a time. One way of doing this is to use a very small data field (say 1 or 2 bits in an already partially used byte) to indicate an increment or decrement in the number. Since the protocol is reliable there should be no problem with stations holding different identifying signals as to what the number should be since all have received all messages.

The buffer storage requirements and traffic on a network on which the protocol according to the invention is used are largely independent of the number of receivers in the acknowledging group, assuming a network with an acceptably low error probability. This protocol requires minimal processing at the receivers, save for a comparison between the sequence numbers of successive messages. There is also minimal danger of traffic congestion as the sending of acknowledgements is strictly controlled by the station transmitting the data.

Preferably, the block of data messages stored in the buffer(s) is a plurality corresponding to the plurality of receivers in the cycle sequence, the stored messages corresponding to the transmitted messages up to and including the latest message transmitted by the source.

Preferably, each data message also comprises a sequence number which the receiver compares with the sequence number in the previous data message to determine whether any messages have been missed. In this regard it is also preferable if the end of a stream of data messages is followed by at least one dummy message which can be compared by the receiver with the last data message in received order to determine whether the last data message transmitted has been missed.

The receiver may transmit a request to retransmit a data message to the source and/or receivers storing the message.

The said latest data messages can be stored at the source and/or at least some of the receivers. When the latest data messages are stored in at least some of the receivers, an initially incorrectly received message is available for retransmission from each of the receivers holding that message in turn according to the position of that message in each buffer associated with each of those receivers. Each listens for the retransmission and if it hears this prior to sending its own copy, it cancels its own transmission. Thus, only one retransmission should occur.

In one form, the source also stores old messages transmitted before the said block of messages in case one of the receivers fails to transmit an acknowledgement in sequence. The source would maintain storage of the old messages for a predetermined period in the event that no response to a request to acknowledge was received from such a receiver.

A subsequent data message may be transmitted from the source before an acknowledgement of the correct reception of the previous message is received, the previous message being stored until the said acknowledgement is received or a predetermined period has elapsed. This is known as "forward windowing".

A receiver may be removed from the sequence by the source removing the requirement for that receiver to acknowledge correct reception of the latest data messages in a particular cycle of the sequence, while the receiver maintains its memory of data messages until the next cycle when it can be removed from the sequence.

The present invention thus provides a communications protocol specifically designed to allow flexible, reliable and simple interaction between any number of computer applications. It may also provide an extension to the current point-to-point protocols which only cater for pairs of processors communicating with each other.

The skilled person will be aware that such a reliable and flexible protocol can be implemented on a wide variety of network arrangements. For example the protocol according to the invention can be implemented on those networks considered in U.S. Pat. No. 4,725,834 discussed above, for example, LAN's implementing International Standards Organization (IS0) 7498 "Description of basic reference model for open systems interconnection"—1984.

BRIEF DESCRIPTION OF THE DRAWINGS

The present invention can be put into practice in several ways, some of which will now be described by way of example, with reference to the accompanying drawings in which:

FIG. 2 is a schematic block diagram of a series of transmitted messages and acknowledgements according to the present invention.

DETAILED DESCRIPTION OF THE DRAWINGS

Figure 1:
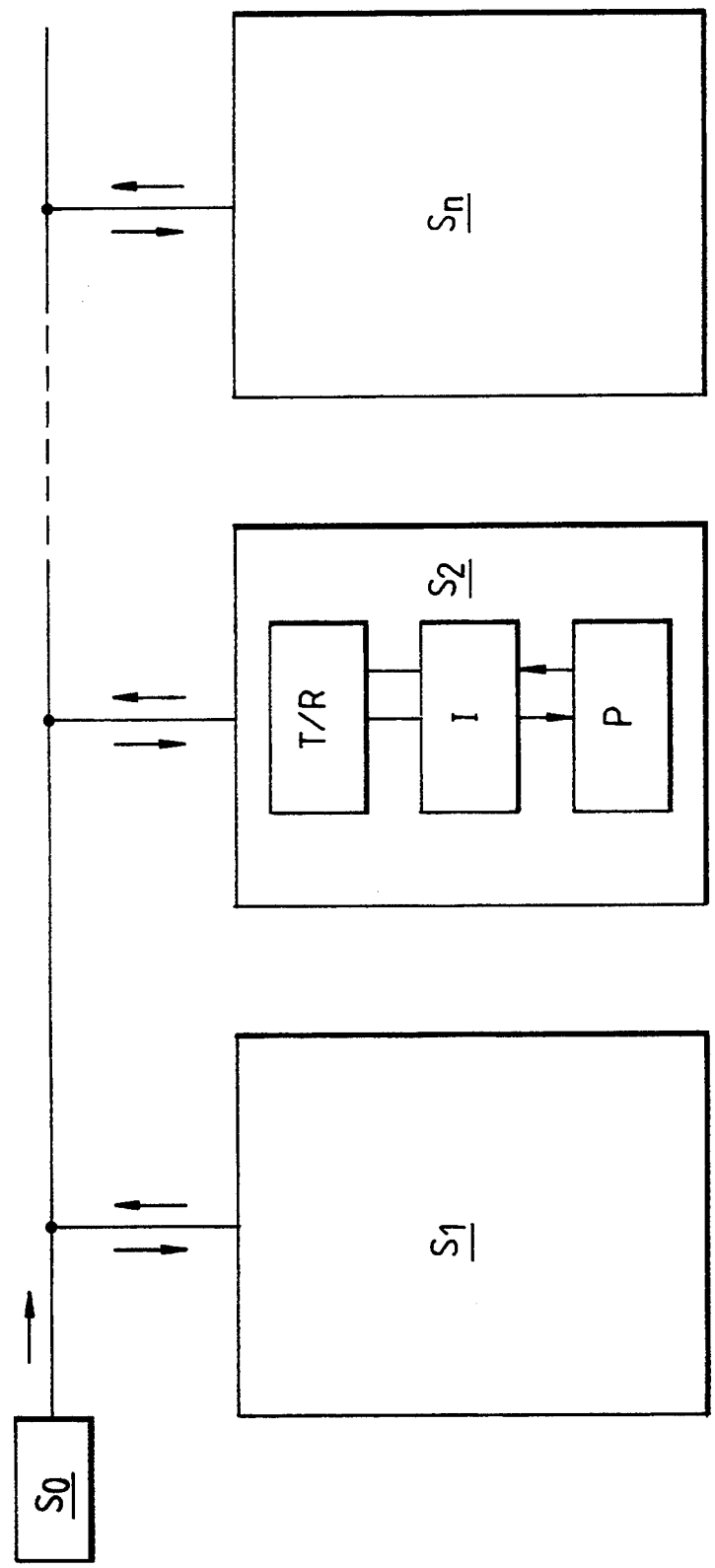
FIG. 1 is a schematic block diagram of a one-to-many communications network on which the present invention can be implemented.

The function of the present invention is to provide a reliable transmission of data from one computer connected to a communications network to a number of other computers connected to the same network, as shown in FIG. 1. In the network illustrated $S_0$ represents the master transmitting station or primary source of data. The direction of flow of data is indicated by the arrows. $S_1$ to $S_n$ represent secondary receiving stations where n is the number of receivers. The master transmitter $S_o$, and each receiver $S_1$ to $S_n$, comprises a transceiver unit T/R, a digital interface unit I and terminal equipment P. The transceiver T/R is set up to accept on behalf of the particular receiving station certain categories of message transmitted from the source. The interface I receives the messages and conditions them for relaying to the terminal equipment P. It also instructs the transceiver T/R in transmitting from that receiver. The implementing protocol is largely confined to the interface I within the transmitter $S_o$ and the receivers $S_1$ to $S_n$.

The following description of the invention assumes the presence of an underlying relatively unreliable "multipoint" datagram facility by which a message may be sent to many (predetermined) receivers. Thus, by "datagram" is meant a single data packet to be sent over the network, the delivery of which cannot be guaranteed.

The master station has complete control over the number of stations acknowledging each data message. Acknowledgement instructions may be subsequently rescinded or altered by further transmissions of control information.

The protocol uses a unique secondary station identifier within the control field of each data message. In addition, there may also be a need for a special case in which none, or all of a predefined subset of receivers should acknowledge data. This can be achieved by the use of codes which are invalid as station identifiers and/or the use of a "flag" indicating whether the code refers to a station identifier or an alterable predetermined set of stations.

However, in the following example the simplest form of the "dynamic soliciting" control is used, namely a single station identifier is included in the control field of each data message. It is also possible to have acknowledgement solicited simultaneously of the same set of data messages from different receivers.

Each of the stations $S_1...\ S_n$ is multicast with the messages. In each message the control field contains a station identifier. The station identifiers are added to each message in turn in a predetermined, but alterable, cyclic sequence so that each station must acknowledge in accordance with the cyclic sequence.

Consider a notionally first message number 1 which has a control field soliciting acknowledgement by the station $S_1$, say. Once the acknowledgement has been received correctly by the master it may infer that all messages up to and including message number 1 have been received correctly by station $S_1$.

Message number 2 has a control field which solicits acknowledgement from station $S_2$. Once the acknowledgement has been received by the master it may infer that station $S_2$ has received correctly all messages up to and including message number 2.

This series of solicited acknowledgements continues throughout the receivers in the group according to a cyclic sequence determined by the control field address in each message.

If messages are numbered uniquely and sequentially, a single confirmation message can acknowledge the receipt of all messages up to and including the sequence number contained within the acknowledgement. Thus, each station need not acknowledge every message. In so doing there is a compromise with the need to keep a copy of any message not yet acknowledged in case it has been lost. The less frequently each station acknowledges, the longer the uncertainty period and the more messages must be stored.

In general message number (n) is acknowledged by the station $S_n$ in sequence. The master can thus infer that the station $S_n$ has received correctly all messages up to and including (n).

Having solicited acknowledgements of correct message receipt from all the stations in the group, the master is able to deduce that at least message number 1 has been correctly received by them all as it is the only message of that particular cycle sequence common to all sets of messages acknowledged by the group since the last solicited acknowledgement in each case. From this determination the master can discard message number 1 as it will not be required to retransmit it to any station.

At the start of another cycle of solicited acknowledgements, which is simply a continuation of the acknowledgements of multicast messages, message number (n+1) is acknowledged by the station $S_1$. As before, the master can infer that all messages up to and including message (n+1) have been received correctly by $S_1$.

At this time the master has received acknowledgements from all the stations that message number 2 has been correctly received. Thus, message number 2 may now be discarded.

Referring to FIG. 2, another example of a protocol according to the present invention is illustrated. The message blocks 10 comprise a data field 12, a receiving station identification address field 14, a sequence order number identifier field 16, and a data message receiver identification field 18. The identification address field 14 and the sequence order number identification field 16 together make up the control field. The control field may, of course, contain other information e.g. a checksum facility to ensure the integrity of the data message packet. The data message identification field 18 indicates that the block 10 is a data message as opposed to, for example, a selective reject, retransmitted data or other type of message.

This embodiment of the present invention illustrates a protocol which combines priming and solicited acknowledgement.

In this particular embodiment the control field solicits an acknowledgement from a particular station, say $S_1$, by requesting it to store the next 3 messages numbers $M+1$, $M+2$ and $M+3$, and only then to acknowledge correct receipt of these three messages. Station $S_2$ is in turn similarly instructed to store message numbers $M+2$, $M+3$ and $M+4$, and so on, for all stations in the group. The acknowledgement transmission comprises an acknowledgement message ACK, the station identification 14 and the sequence identifier field 16. The acknowledgement transmission may also incorporate other fields, e.g. relating to buffer space available.

The acknowledgement sent by, for example, station $S_1$ is transmitted after correct receipt of message number $M+3$. Similarly, $S_n$ acknowledges after correct receipt of message number $M+n+2$ after the next cycle sequence has been embarked upon. In this way, the deferred solicited acknowledgement of correct receipt continues indefinitely around the cycle sequence.

The general principal is that of taking acknowledgements in a cycle of length L, say such that in the space of L messages, each receiver has acknowledged at least once and that for every cycle of acknowledgement starting anywhere in the group there will be a common message acknowledged which can be discarded. Doing this means that it is only necessary to keep the L latest messages for retransmission in the event of bad or no reception. This is because all the stations have acknowledged correct receipt at least up to the number of the current message minus L.

When a network is first initialized to follow a sequence there will be a set of messages in the first cycle which will not be part of a full buffer of messages to be acknowledged. To overcome this, a number of receivers are "primed" to provide acknowledgements to the first few messages, even though their buffers are not full, by a special control message which precedes the first data message.

The protocol between the primary and the secondary receivers is set up to compare the sequence number of a transmitted message with that sequence number it is next expecting. From this comparison it will be able to determine whether it has suffered a lost message. In the event that it has, based on the comparison, it will then request a retransmission of the missing message(s) by the use of a "selective reject" message which specifies the sequence number of the lost or corrupted message which the particular receiver requires to be retransmitted. This will be received by the station holding a copy of the requested message which will then be retransmitted.

Whilst it would be usual to store the messages not universally acknowledged at the primary transmitting station for retransmission it is equally possible for one or more secondaries to be nominated as a storage site that can be accessed to retransmit the lost data message. Having the storage of the messages confined to the primary station limits the group size to the storage capacity available at the primary. By distributing the buffer storage to nominated secondaries this potential limit on group size is alleviated. Indeed, it is equally possible to distribute the simultaneous storage of messages among the secondaries in order to spread the storage load further.

If distributed buffering is used, the selective reject message can be transmitted as a multicast to the whole group of receivers as well as to the transmitting station. This allows stations to overhear each other's selective rejects so that, should several of them miss the same message only one selective reject need be sent. This is achieved by allowing only the station which would normally have acknowledged the missing message to send its selective reject as soon as the loss is noticed. All other stations wait a short period before sending selective reject and, should they hear selective reject from any other station, they postpone the transmission of their selective reject since they know that retransmission of the missing message has already been requested.

Other stations which receive the message correctly on the first multicast will ignore the requested retransmissions whilst those that requested it will receive it and then await the next message. In the rare event of this retransmission procedure not working due to continued errors, it may be repeated up to a predetermined number of times. Should it still not have succeeded, failure of the connection will be indicated to the receiving station.

The above regime of selective rejection works only if the secondary is alerted to a missed message or sequence due to the reception of a following message. This will not occur if the message missed is at the end of a burst of messages. Such errors will remain undetected until such time as more messages are transmitted some time later. In order to limit the recovery time for such "tail-end" errors, additional empty or "null data" dummy messages can be sent at the end of a burst if no further data is ready for transmission within a predetermined period. The use of null data messages involves a compromise between the requirement of prompt correction/reinstatement of messages and a desire not to overload the network, primary and secondaries with excessive null data message traffic. To accommodate both of these, the protocol is set up to transmit null data messages at exponentially increasing times after the last data message up to a maximum period which will not load the network significantly. Clearly, any other decrease in the frequency of null data messages could be devised according to a specific application.

As an example, in a LAN implementation, null data messages may be sent 100 milliseconds, 400 milliseconds, 1.6 seconds and 6.4 seconds after the last real data message. Thereafter, they are sent at 10 second intervals to provide a continuous check on the correct functioning of the station. This particular choice of times and multiplying factors gives each secondary two chances to detect the failure within half a second of the message loss but only loads the network with a message every 10 seconds between data bursts.

Since each receiving station acknowledges in turn, any that has failed will be detected within, at most, one sequence cycle of length L by the fact that it has not returned an acknowledgement within a predetermined time after being solicited to do so. However, there is also the possibility that this event could be due to a single transmission error such that the acknowledging secondary station failed to receive the particular message that it has to acknowledge or the acknowledgement was corrupted on its way to the primary station, the receiver having received the message and performed correctly.

To allow for a distinction to be drawn between the two different message reception failures, the secondary in question is not immediately reported as having failed. Instead, it is first marked as "suspect". The primary will retransmit the message for which acknowledgement is outstanding but may then continue with subsequent transmissions, while retaining the previous messages over which there is doubt about reception so long as it has sufficient memory to do so without having to discard any of the L current messages. This condition is necessary since the primary has no confirmation that the old messages held, predating the L current messages, have been received by the suspect secondary.

If the suspect station is functioning correctly, it should acknowledge reception again or accept and acknowledge the retransmission if it had missed the previous message. It may also send selective rejects for other messages previous to this one that it had missed. On receiving this the primary knows that all is well and reinstates the station as "functioning".

If, however, no such message is received within a predetermined time, the station is marked as "dead" and the high level application software, to which the network is interfaced, is notified. The oldest messages retained for retransmission to the now dead secondary are then discarded.

As noted briefly above, the size of the buffer storage required by this protocol grows linearly with the number of receivers in the group. This can be overcome by the storage of messages not just at the primary but also at some or all of the receivers as well. To achieve this the significance of the acknowledgement must be redefined. As well as indicating that the secondary has correctly received all messages up to and including the one being acknowledged, the acknowledgement must also indicate that the secondary will store the previous L messages on the behalf of the primary and will not discard them until its next acknowledgement.

Thus, each secondary has a store of L messages prior to and including the one at which it is acknowledged. Since each receiver acknowledges a different message, each will have a different set of L messages in its buffer. The set of stored L messages in a buffer at each secondary overlaps with those stored in the previous and subsequent secondaries in the sequence. As long as less than L secondaries fail there will always be at least one copy of each message that survives.

In the event that a secondary misses a message, its selective reject message is sent not just to the primary but to the rest of the group. On receipt of the selective reject message, up to L receivers could respond by sending a copy of the message held in their buffer. To avoid swamping the network with many such retransmissions, each secondary holding a copy of the requested message calculates its "priority" based on how close to the top of the "last-in first-out" buffer the message in error is. The secondary with the highest priority, i.e. with that message closest to the top of the buffer, transmits the message immediately. The lower priority secondaries await their turn to transmit the message based on a calculation of a time delay for each priority level in the buffer. Each low priority secondary will only transmit the message if it does not detect transmission from a station with a higher priority during its alloted accumulated delay time.

This priority scheme can be further adapted so that the primary only retransmits the most recent L messages only. It need only keep the previous L acknowledged messages. All older ones may be discarded by it.

The throughput of this protocol can be improved by not waiting for the acknowledgement for one message before sending the next, provided the previous message is stored in case the acknowledgement is not received. This scheme is called "forward windowing" and can be applied provided that the secondaries have sufficient additional storage capacity to cope with the high speed bursts of messages that result.

As described with reference to FIG. 2, the receiving secondary may be requested to acknowledge "the L'th message after this one". When a distributed buffering scheme is to be used as well, this advance warning allows the secondary to allocate storage for the subsequent L messages which it is expected to store and be ready to acknowledge immediately upon receipt of all of them. This also means that it need not keep storing messages all the time, but only after it has been requested to do so.

Because the protocol solicits an acknowledgement periodically from a receiver it may be desirable to "syncronise" all the receivers from time to time in order that the source is able to make an up-to-date assessment of the current condition of all the receivers at that time. To do this a common address solicitation is sent requiring acknowledgement from all the receivers in the sequence. Typically, an FFFF address can be used for this.

On the other hand, in a reasonably inherently reliable communications network it may be justifiable to solicit an acknowledgement in the sequence only after a batch of several messages have been transmitted, on the assumption that all in the batch are likely to get through successfully. The trade-off in this is that an entire batch of messages may have to be retransmitted in the event that corruption or non-reception of only part of a batch is detected. Thus, no acknowledgement is required of each and every message and the acknowledgement traffic is thereby reduced. To achieve this the control field for each message in a batch except the particular one soliciting acknowledgement of the batch is furnished with a dummy address not associated with any of the receivers, say 0000, for example.

In the above, the protocol according to the invention has been described in terms of providing high performance "one-to-many" transmissions. However, by invoking the protocol at any station that wishes to transmit, it may easily be extended to give reliable "many-to-many" communications. Each invocation of the protocol is then uniquely identified by the station address of the transmitting station.

The protocol described relies on the primary having an up-to-date knowledge of the receivers with which it is communicating. The addition of a receiver to this list is simply achieved by inserting it into the list of receiving stations and soliciting an acknowledgement from it in this and all subsequent cycles of acknowledgement.

If the distributed buffer scheme is employed, the removal of a station from the list must be achieved in a controlled fashion. This involves marking the station as "leaving" such that it will not be requested to acknowledge on this cycle but will still listen for and support selective reject messages for those messages it holds. When its turn in the cycle is next reached, it is notified that it may then and only then discard its messages in its buffer and stop receiving. The station following it in the cycle is asked to acknowledge instead.

I claim:

1. A method of data communication between a primary source ($S_o$) and a group of secondary receivers ($S_1$... $S_n$), the method comprising:

transmitting data messages (10) from the source to the receivers;

storing, in buffer storage means, a set of latest data messages, for retransmission of at least one of the said set in the event that no acknowledgement of at least that said one of the said set of data messages is received successfully by the source;

transmitting instructions for controlling when each receiver is to transmit an acknowledgement of receipt of a respective set of those data messages received since each receiver previously transmitted an acknowledgement, not all receivers being required by said instructions to transmit an acknowledgment of every correctly received data message in each respective set prior to transmission by the source of further data messages not previously transmitted;

transmitting from one receiver, in accordance with a corresponding controlling instruction for said one receiver and in a cyclic sequence among at least some of the receivers, an acknowledgement indicative of correct receipt by the said one receiver of the respective set of data messages received since the one receiver previously transmitted an acknowledgement, said respective set of data messages acknowledged by the one receiver, during a continuing transmission of a sequence of data messages, including at least one further data message not previously acknowledged by at least one other receiver in the group; and transmitting from said at least one other receiver, in accordance with a corresponding controlling instruction for said at least one other receiver, an acknowledgment of those data messages correctly received in the set of data messages transmitted since said at least one other receiver previously transmitted an acknowledgement, said set including the at least one further data message from the respective set acknowledged by the one receiver and at least one more further data message not previously acknowledged by said one receiver.

2. A method of data communication between a primary source ($S_0$) and a group of secondary receivers ($S_1$... $S_n$), the method comprising:

transmitting data messages (10) from the source to the receivers;

storing, in buffer storage means, a set of latest data messages, for retransmission of at least one of the said set in the event that no acknowledgement of at least that said one of the said set of data messages is received successfully by the source;

transmitting instructions for controlling when each receiver is to transmit an acknowledgement of receipt of a respective set of those data messages received since each receiver previously transmitted an acknowledgement, not all receivers being required by said instructions to transmit an acknowledgement of every correctly received data message in each respective set prior to transmission by the source of further data messages not previously transmitted;

transmitting from one receiver, in accordance with a corresponding controlling instruction for said one receiver and in a cyclic sequence among at least some of the receivers, an acknowledgement indicative of correct receipt by the said one receiver of the respective set of data messages received since the one receiver previously transmitted an acknowledgement, said respective set of data messages acknowledged by the one receiver, during a continuing transmission of a sequence of data messages, including at least one further data message not previously acknowledged by at least one other receiver in the group;

transmitting from said at least one other receiver, in accordance with a corresponding controlling instruction for said at least one other receiver, an acknowledgement of correct receipt by the said at least one other receiver of the respective set of data messages correctly received since said at least one other receiver previously transmitted an acknowledgement, said respective set including the at least one further data message from the respective set acknowledged by the one receiver and at least one more further data message not previously acknowledged by said one receiver; and successfully receiving at the source the acknowledgement indicative of correct receipt by the one receiver and the acknowledgement indicative of correct receipt by the at least one other receiver.

3. A method of data communication between a primary source ($S_0$) and a group of secondary receivers ($S_1 ... S_n$), the method comprising:

transmitting data messages (10) from the source to the receivers;

storing, in buffer storage means, a set of latest data messages, for retransmission of at least one of the said set inn the event that no acknowledgement of at least that said one of the said set of data messages is received successfully by the source;

transmitting instructions for controlling when each receiver is to transmit an acknowledgement of receipt of a respective set of those data messages received since each receiver previously transmitted an acknowledgement, not all receivers being required by said instructions to transmit an acknowledgement of every correctly received data message in each respective set prior to transmission by the source of further data messages not previously transmitted;

transmitting from one receiver, in accordance with a corresponding controlling instruction for said one receiver and in a cyclic sequence among at least some of the receivers, an acknowledgement indicative of correct receipt by the said one receiver of the respective set of data messages received since the one receiver previously transmitted an acknowledgement, said respective set of data messages acknowledged by the one received during a continuing transmission of a sequence of data messages, including at least one further data message not previously acknowledged by at least one other receiver in the group;

transmitting from said at least one other receiver, in accordance with a corresponding controlling instruction for said at least one other receiver, an acknowledgement of correct receipt by the said at least one other receiver of the respective set of data messages correctly received since said at least one other receiver previously transmitted an acknowledgement, said respective set including the at least one further data message from the respective set acknowledged by the one receiver and at least one more further data message not previously acknowledged by said one receiver; and performing at least one of the following:

successfully receiving at the source the acknowledgement indicative of correct receipt by the one received and the acknowledgement indicative of correct receipt by the at least one other receiver;

retransmitting at least one of the set of latest data messages stored in the buffer storage means in the event of an acknowledgement not being successfully received.

4. A method as claimed in claims 1, 2, or 3 in which the storing step involves storing a plurality of data messages corresponding to the plurality of receivers in the sequence, the stored messages corresponding to the transmitted messages up to and including the latest message transmitted by the source.

5. A method as claimed in claims 1, 2, or 3 in which each receiver is instructed to acknowledge in sequence a different one of successive sets of data messages, the sets differing as to the latest data message transmitted by the source prior to the transmission of the corresponding acknowledgement, said latest data message in each case not having been included in any preceding set of data messages acknowledged.

6. A method as claimed in claims 1 or 3 in which the buffer stores a series of older messages transmitted before the said set of latest messages for retransmission in the event that one of the receivers fails to transmit timely acknowledgement in sequence, the buffer retaining the older messages for a predetermined period in the absence of such acknowledgement and discarding the older messages thereafter if no response to a request to acknowledge is received from that receiver in that period.

7. A method as claimed in claim 1, 2 or 3 in which the data messages and the acknowledgements are transmitted over a common communication network.

8. A method as claimed in claims 1, 2, or 3 in which the latest messages are stored in the buffer storage means at the source.

9. A method as claimed in claim 1 in which, when the latest messages are stored in the buffer of at least one of the receivers, that receiver is removed from the sequence by the source removing the requirement for that receiver to acknowledge on one cycle of the sequence while maintaining that receiver in the sequence in order to allow access to the buffer of that receiver to enable retransmission of a message from that receiver, if necessary, until the next cycle when the receiver is removed from the sequence for all purposes.

10. A method as claimed in claims 1 or 3 in which the latest messages are stored in the buffer storage means at a receiver for retransmission, if required, from such receiver.

11. A method as claimed in claim 10 in which, when the latest messages are stored in the buffers in at least some of the receivers, and a message is unacknowledged by at least one receiver that message is retransmitted from one of the receivers holding that message, and, if necessary, further retransmissions are made from each of the said receivers holding the message in turn, unless the message is successfully acknowledged, until a predetermined limit on the number of retransmissions is reached, the order of retransmission being defined according to the position of that message in each of the buffers associated with the receivers.

12. A method as claimed in claims 1, 2, or 3 in which each data message comprises a control field, having a receiver address code (14), which solicits an acknowledgement from, and specifically identifies at least one of the receivers, successive data messages having receiver address codes alternating in accordance with the sequence, for soliciting acknowledgements from, and specifically identifying, receivers in the sequence in turn.

13. A method as claimed in claim 12 in which the acknowledgement solicited by the control field in one data message is delayed to include a number of further data messages in accordance with further instructions in that said control field or a control field in a previously transmitted data message.

14. A method as claimed in claim 12 in which each data message control field also comprises a sequence number (16) which the receiver compares with the sequence number in the following data message to determine whether any messages have been missed.

15. A method as claimed in claim 14 in which at least one dummy message is transmitted by the source at the end of a burst of data messages, the receiver comparing the last data message received with the dummy message to determine whether the last data message of the burst transmitted has been missed.

16. A method as claimed in claim 15 in which the dummy message is repeatedly transmitted with decreasing frequency after the last data message of the burst is transmitted.

17. A data communication system comprising:
a primary source ($S_0$) for transmitting data messages (10);
a plurality of receivers ($S_1$... $S_n$) each including means for transmitting an acknowledgement (ACK) on correct receipt of a data message;
buffer storage means for storing a set of latest data messages and including means for retransmitting at least one of the said set in the event that no acknowledgement of at least that said one of the said set of data messages is received successfully by the source;
wherein the source transmits instructions for controlling when each receiver is to transmit an acknowledgement of receipt of a respective set of those data messages received since each receiver previously transmitted an acknowledgement, not all receivers being required by said instructions to transmit an acknowledgment of every correctly received data message in each respective set prior to transmission by the source of further data messages not previously transmitted;
wherein at least one of the receivers transmits, in accordance with a corresponding control instruction for that receiver and in a cyclic sequence among at least some of the receivers, an acknowledgement indicative of correct receipt by said one receiver of the respective set of data messages received since the one receiver previously transmitted an acknowledgement, said respective set of data messages acknowledged by the one receiver, during a continuing transmission of a sequence of data messages, including at least one further data message not previously acknowledged by at least one other receiver in the group; and
wherein the at least one other receiver in the group transmits, in accordance with a corresponding controlling instruction for said at least one other receiver, an acknowledgement of those data messages correctly received in the set of data messages transmitted since said at least one other receiver previously transmitted an acknowledgment, said set including the least one further data message acknowledged by the one receiver and at least one more further data message not previously acknowledged by said one receiver.

18. A data communication system comprising:
a primary source ($S_0$) for transmitting data messages;
a plurality of receivers ($S_1$... $S_n$) each including means for transmitting an acknowledgement (CK) on correct receipt of a data message;
buffer storage means for storing a set of latest data messages and including means for retransmission at least one of the said set in the event that no acknowledgement of at least that said one of the said set of data messages is received successfully by the source;
wherein the source transmits instructions for controlling when each receiver is to transmit an acknowledgement of receipt of a respective set of those data messages received since each receiver previously transmitted an acknowledgement, not all receivers being required by said instructions to transmit an acknowledgement of every correctly received data message in each respective set prior to transmission by the source of further data messages not previously transmitted;
wherein at least one of the receivers transmits, in accordance with a corresponding control instruction for that receiver and in a cyclic sequence among at least some of the receivers, an acknowledgement indicative of correct receipt by the said one receiver of the respective set of data messages received since the one receiver previously transmitted an acknowledgement, said respective set of data messages acknowledged by the one receiver, during a continuing transmission of a sequence of data messages, including at least one further data message not previously acknowledged by at least one other receiver in the group;
wherein the at least one other receiver in the group transmits, in accordance with a corresponding controlling instruction for said at least one other receiver, an acknowledgement of correct receipt by the said at least one other receiver of the respective set of data messages correctly received since said at least one other receiver previously transmitted an acknowledgement, said respective set including the at least one further data message from the respective set acknowledged by the one receiver and at least one more further data message not previously acknowledged by said one receiver; and
wherein the source successfully receives the acknowledgement indicative of correct receipt by the one receiver and the acknowledgement indicative of correct receipt by the at least one other receiver.

19. A data communication system comprising:
a primary source ($S_0$) for transmitting data messages;
a plurality of receivers ($S_1$... $S_n$) each including means for transmitting an acknowledgement (CK) on correct receipt of a data message;
buffer storage means for storing a set of latest data messages and including means for retransmission at least one of the said set in the event that no acknowledgement of at least that said one of the said set of data messages is received successfully by the source;
wherein the source transmits instructions for controlling when each receiver is to transmit an acknowledgement of receipt of a respective set of those data messages received since each receiver previously transmitted an acknowledgement, not all receivers being required by said instructions to transmit an acknowledgement of every correctly received data message in each respective set prior to transmission by the source of further data messages not previously transmitted;
wherein at least one of the receivers transmits, in accordance with a corresponding control instruction for that receiver and in a cyclic sequence among at least some of the receivers, an acknowledgement indicative of correct receipt by the said one receiver of the respective set of data messages received since the one receiver previously transmitted an acknowledgement, said respective set of data messages acknowledged by the one receiver, during a continuing transmission of a sequence of data messages, including at least one further data message not previously acknowledged by at least one other receiver in the group;

wherein the at least one other receiver in the group transmits, in accordance with a corresponding controlling instruction for said at least one other receiver, an acknowledgement of correct receipt by the said at least one other receiver of the respective set of data messages correctly received since said at least one other receiver previously transmitted an acknowledgement, said respective set including the at least one further data message from the respective set acknowledged by the one receiver and at least one more further data message not previously acknowledged by said one receiver;

wherein the system performs at least one of the following:

the source successfully receives the acknowledgement indicative of correct receipt by the one receiver and the acknowledgement indicative of correct receipt by the at least one other receiver;

at least one of the set of latest data messages stored in the buffer storage means is retransmitted in the event of an acknowledgement not being successfully received.

20. A system as claimed in claims 17, 18 or 19 in which the set acknowledged by a respective receiver comprises a plurality of data messages corresponding to the plurality of receivers in the sequence, the storage means being arranged to store the data messages transmitted up to and including the latest message transmitted by the source.

21. A system as claimed in claims 17, 18 or 19 in which each receiver is arranged on instruction from the source to acknowledge in sequence a different one of the successive sets of data messages, the sets differing as to the latest data message transmitted by the source prior to the transmission of the corresponding acknowledgement, and said latest data message in each case not having been included in any preceding set of data message acknowledged.

22. A system as claimed in claim 17 or 19 in which the buffer storage means are also arranged to store a series of older messages transmitted before the said set of latest data messages for retransmission in the event that one of the receivers fails to transmit timely acknowledgement in sequence, the buffer storage means being arranged to retain the older messages for a predetermined period in the absence of such acknowledgement and to discard the older messages thereafter if no response to a request to acknowledge is received from the one receiver in that period.

23. A system as claimed in claim 17 including a communications network connected between the source and the receivers over which the messages and acknowledgements are transmitted.

24. A system as claimed in claims 17, 18 or 19 in which the receivers include means responsive to a control field in the data message, which field comprises a receiver address code (14) which solicits an acknowledgement from, and specifically identifies, at least one of the receivers, following data messages having receiver address codes alternating in accordance with the sequence, for soliciting acknowledgements from, and specifically identifying, receivers in the sequence in turn.

25. A system as claimed in claim 24 in which each receiver includes means responsive to a further code in the control field in one data message to delay the transmission of the solicited acknowledgement to include a number of further data messages.

26. A system as claimed in claims 17, 19, or 19 in which the latest messages are stored in the buffer storage means at the source.

27. A system as claim in claim 23 in which when the latest messages are stored in the buffer of at least one of the receivers, the source includes means for removing the requirement for that receiver to acknowledge in one cycle of the sequence while maintaining the requirement for that receiver to store the latest messages in its respective buffer, to enable retransmission of a message from that receiver, if necessary, until the next cycle is complete when such receiver can be removed from the sequence for all purposes.

28. A system as claimed in claims 17 or 19 in which the latest messages are stored in the buffer storage means at a receiver for retransmission, if required, from such receiver.

29. A system as claimed in claim 23 in which the latest messages are stored in the buffers in at least some of the receivers, and the receivers holding said messages include means for selectively retransmitting at least one such message, if such message is unacknowledged by a receiver, retransmissions being made, if necessary, from each receiver holding the message in turn, unless the message is successfully acknowledged, until a predetermined limit on the number of retransmissions is reached, the order of retransmission from the receivers holding the messages being defined in accordance with the position of the one message in each of the buffers.

30. As system as claimed in claim 17, 18, or 19, in which the receiver includes means responsive to control field in the data message and in which the receiver includes means for comparing a sequence number (16) in the data message control field with the sequence number in a following data message to determine whether any messages have been missed.

31. A system as claimed in claim 30 in which at least one dummy message is transmitted by the source at the end of a burst of data messages, each receiver being arranged to compare the last data message received with the dummy message to determine whether the last data message transmitted has been missed.

32. A system as claimed in claim 31 in which the source is operable to transmit the dummy message repeatedly with decreasing frequency after the last data message of the burst is transmitted.

* * * * *